US006771988B2

(12) United States Patent
Matsuoka et al.

(10) Patent No.: US 6,771,988 B2
(45) Date of Patent: Aug. 3, 2004

(54) RADIO COMMUNICATION APPARATUS USING ADAPTIVE ANTENNA

(75) Inventors: Hidehiro Matsuoka, Yokohama (JP); Hiroki Shoki, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 529 days.

(21) Appl. No.: 09/745,475

(22) Filed: Dec. 26, 2000

(65) Prior Publication Data

US 2001/0049295 A1 Dec. 6, 2001

(30) Foreign Application Priority Data

Dec. 27, 1999 (JP) .......................................... 11-371762
Nov. 17, 2000 (JP) ....................................... 2000-351612

(51) Int. Cl.[7] .............................................. H04M 1/00
(52) U.S. Cl. ...................... 455/562.1; 455/69; 455/63.4
(58) Field of Search ............................ 455/561, 562.1, 455/67.16, 456.1, 69, 63.1, 63.3, 63.4

(56) References Cited

U.S. PATENT DOCUMENTS

| | | | |
|---|---|---|---|
| 6,061,553 A | * | 5/2000 | Matsuoka et al. .......... 455/273 |
| 6,397,082 B1 | * | 5/2002 | Searle ...................... 455/562.1 |
| 6,512,917 B1 | * | 1/2003 | Hiramatsu ................... 455/69 |
| 6,556,845 B1 | * | 4/2003 | Ide et al. .................. 455/562.1 |
| 2002/0123372 A1 | * | 9/2002 | Kobayakawa ............... 455/562 |
| 2003/0129996 A1 | * | 7/2003 | Maloney et al. ............ 455/456 |

OTHER PUBLICATIONS

Shigeru Tomisato, et al. "Performances of Adaptive Transmission Array in TDD Mobile Communication Systems", IEICE Spring Conference 1997, Mar. 1997, p. 474.
Hiromitsu Asakura, et al. "An Algorithm for Down Link Adaptive Beam Forming and its Performances", IEICE Spring Conference 1997, Mar. 1997, p. 475.
J. Litva et al. "Digital Beamforming in Wireless Communications", Artech House Publishers, 1996, pp. 182–183.
Isamu Chiba, et al. "Beam Space CMA Adaptive Array Antennas", IEICE Paper, vol. J77–B–II, No. 3, Mar. 1994, pp. 130–138.

* cited by examiner

*Primary Examiner*—Minh Dao
(74) *Attorney, Agent, or Firm*—Oblon, Spivak, McClelland, Maier & Neustadt, P.C.

(57) ABSTRACT

In a radio communication apparatus, delay profiles of a desired wave and delay waves thereof are estimated by plural delay profile estimation sections for each of received signals from directional antennas constituting an array antenna. Received signals from the antennas selected by a reception antenna selector on the basis of the delay profile are subjected to a temporal/spatial equalization processing by an adaptive signal processing section and a path diversity combining section, thereby obtaining a reception output. An arrival angle range of the desired wave is estimated by a DOA estimation section from the delay profile estimated by the delay profile estimation section. Based on the arrival angle range, the antenna for transmission is selected by a transmission antenna selection section, and transmission signals are sent out.

18 Claims, 9 Drawing Sheets

RADIO COMMUNICATION APPARATUS USING ADAPTIVE ANTENNA

CROSS-REFERENCE TO RELATED APPLICATIONS

This application is based upon and claims the benefit of priority from the prior Japanese Patent Applications No. 11-371762, filed Dec. 27, 1999; and No. 2000-351612, filed Nov. 17, 2000, the entire contents of which are incorporated herein by reference.

BACKGROUND OF THE INVENTION

The present invention relates generally to a radio communication apparatus using an adaptive antenna, which is applied to a mobile radio communication system, etc., and more particularly to a transmission beam control apparatus for desirably controlling antenna directivity at the time of transmission.

In land mobile communications, there will frequently occur degradation in received signal level due to fading, or a signal distortion due to co-channel interference (CCI) or intersymbol interference (ISI).

In such a severe environment for signal propagation, in order to exactly extract a desired wave, it is effective to use an adaptive antenna which suitably controls antenna directivity. Adaptive arrays are well-known as an example of adaptive antennas. Adaptive arrays possibility suppress interface signals by pointing nulls to interfacing stations.

In land mobile communications, however, the size of a terminal station needs to be reduced for portability. In general cases, adaptive arrays are applied to a base station because of having plural antennas.

Adaptive arrays are array antennas which synthesize received signals from a plurality of antennas by controlling the phases and amplitudes of the signals. Even when high-level interference waves are present, a beam is turned to a direction from which a desired wave is incident and nulls (a point with no gain) are turned to directions from which interference waves are incident. Thereby, a reception SIR (a desired wave to interference wave ratio) can be increased to a maximum.

The operation of controlling and synthesizing the phases and amplitudes of received signals is equivalent to an operation wherein received signals from plural antennas #1, #2, . . . , #N are subjected to complex weighting, as shown in FIG. 1, by means of complex multipliers 1-1, 1-2, . . . , 1-N, which multiply N received signals by reception weight vectors calculated by a reception weight vector calculation section 2, and the resultant signals are synthesized by an adder 3. In this case, an output y ("adaptive array output") from the adder 3 is given by $$y = w^T x \quad (1)$$

In this equation, w is a complex weight vector (hereinafter referred to as "reception weight vector") applied to the received signal from each antenna, and x is a complex received signal vector from each antenna, w and x being expressed by $$w = (w1, w2, \ldots, wj, \ldots, wN)^T \quad (2)$$

$$x = (x1, x2, \ldots, xj, \ldots, xN)^T \quad (3)$$

wherein T denotes transposition of matrix.

The reception weight vector w is controlled so that the adaptive array output y may satisfy a predetermined criterion. According to criteria, for example, an average square error between the adaptive array output y and an ideal signal sequence is reduced to a minimum, or a signal power of the adaptive array output y is reduced to a minimum under a constraint on the direction of arrival (DOA) of a desired wave. In this way, with respect to the reception in the base station (that is uplink), the received signals from plural antennas are weighted and consequently a distortionless signal can be obtained.

The above description is directed to the case where a omni-directional antenna is used as antenna, and this type of signal processing is called "element space processing." On the other hand, there is known "beam space processing" wherein a plurality of beams with different directions of radiation are formed in advance and received signals obtained by the beams are subjected to an adaptive array processing.

If a beam space adaptive array is used, a pre-processing beam generator needs to be additionally provided. However, since a signal output with a high SNR (signal-to-noise ratio), combined with a beam gain, is obtained, a stable adaptive array processing can be expected by selecting appropriate beams. Moreover, since the number of branches input to the adaptive array can be reduced, the amount of arithmetic operations for signal processing can be reduced accordingly.

This feature is described, for example, in document [1] (Chiba, Nakajo, Fujise, "BEAM SPACE CMA ADAPTIVE ARRAY ANTENNA", IEICE Transaction of the Communications, B-II, vol. J77-B-II, no. 3, pp. 130–138, March 1994).

In general, a beam space adaptive array generates spatially orthogonal beams. However, as non-orthogonal beams, an adaptive antenna using directional antennas overlapping between adjacent beams has been studied.

For example, document [2] (Jpn. Pat. Appln. KOKAI Publication No. 10-256821 (Matsuoka, et al.)) proposes an adaptive antenna capable of efficiently combining delay wave energy by performing not only a space domain process using an adaptive array antenna but also a time domain process using path diversity.

On the other hand, many downlink beam forming methods to synthesis optimal transmission beam pattern using an array antenna has been studied. For example, in TDD (Time Division Duplex) system wherein transmission/reception is periodically switched by time division, since the same frequency is used in the transmission/reception, it can be regarded that the propagation channel responses of transmission and reception are substantially equal.

Accordingly, as shown in document [3] (Tomisato, Matsumoto, "EFFECT OF ADAPTIVE TRANSMISSION ARRAY IN TDD MOBILE COMMUNICATION SYSTEM", 1997 IEICE Spring conference, B-5-87, March 1997), the reception SIR at the terminal station can be improved by using the same weight vector for transmission/reception, i.e., by forming the same antenna pattern in transmission as is obtained at the time of reception.

However, as in the case of FDD (Frequency Division Duplex) where different frequencies are used for transmission and reception, the correlation in propagation channel response between uplink and downlink is small. Thus, even if a transmission weight vector that is equal to a reception weight vector is used, optimal reception at the terminal station is not always ensured (e.g. see document [4] (J. Litva, T. K.-Y. Lo, "Digital Beamforming in Wireless Communications," Artech House Publishers, pp. 182–183, 1996).

As stated above, although the propagation channel response differs between uplink and downlink, there is reversibility between uplink and downlink with respect to the direction of arrival of radio waves. Specifically, except for a case where the speed of movement of the terminal station is excessively high, the reception SIR at the terminal station can be increased to a maximum by estimating DOA of reception ratio waves at the base station and setting the beam and null in that direction.

For the purpose of such transmission beam pattern control, the estimation of the DOA is indispensable. As a signal processing for the estimation of the DOA, there is known a MUSIC (MUltiple SIgnal Classification) algorithm, etc. are known.

However, a great amount of calculations is required for a high-resolution DOA estimation algorithm represented by MUSIC. This algorithm is not suitable in a case of estimating the DOA which varies from time to time depending on the movement of the terminal station or a variation in environment.

Even if numerous arithmetic operations are performed to precisely estimate the DOA, and the weighting for directivity is carried out to set the null in the estimated DOA, the direction of the null may deviate due to defective calibration of the transmission circuit. Furthermore, the effect of this technique may deteriorate due to the angle spread by reflection/dispersion near the terminal station in the actual propagation path. As a result, the average reception SIR at the terminal station may deteriorate.

Besides, if the number of incoming waves is greater than the number of antennas in the multi-path environment, it is difficult to estimate the DOA by MUSIC.

BRIEF SUMMARY OF THE INVENTION

The present invention has been made to solve the above problems, and its object is to provide a radio communication apparatus which is applicable to a system using different frequencies for uplink and downlink and can easily estimate a DOA of radio waves and enhance an average reception SIR at an opposing-side station.

In order to solve the above problems, the present invention has the feature that an arrival angle range indicating an approximate arrival direction of a desired wave is estimated on the basis of a delay profile estimated in a reception system for a predetermined signal processing (e.g. a temporal/spatial equalization signal processing), and an optimal antenna or beam is selected on the basis of the arrival angle range, thereby effecting signal transmission.

Specifically, a radio communication apparatus according to the present invention comprises: a plurality of directional antennas; a delay profile estimation section configured to estimate a delay profile representing arrival times of a desired wave and delay waves and received powers for each of received signals from said antennas; an arrival angle range estimation section configured to estimate an arrival angle range of said desired wave from the delay profiles of the received signals estimated by said delay profile estimation section; a transmission antenna selection section configured to select at least one of the antennas which is to be used for transmission, on the basis of the arrival angle range estimated by said arrival angle range estimation section; and a transmission section configured to transmit transmission signals using said at least one antenna selected by said transmission antenna selection section.

With the above structure, in a mobile radio communication system using different frequencies for uplink and downlink, an arrival angle range of a desired wave can easily be estimated only by observing a received power value of each of the desired wave and delay waves, making use of a delay profile for each directional antenna which has already been measured for a temporal/spatial equalization processing. It is possible to easily select an optimal transmission antenna based on a radio wave arrival direction in which reversibility is established between uplink and downlink. An average reception SNR and an average reception SIR can be enhanced at an opposing-side station. Since an arrival angle range can be detected for delay waves at the same time, a transmission (time) diversity effect is expected to be obtained by using the DOA for delay wave.

In the above basic structure, the radio communication apparatus may further comprise arrival direction estimation section configured to estimate a direction of arrival of the desired wave from the arrival angle range estimated by the arrival angle range estimation section; and transmission weight vector generating section configured to generate such transmission weight vectors as to set a maximum gain direction of directivity at a time of transmission in the estimated arrival direction.

In this case, the transmission antenna selection section selects a plurality of antennas included in the arrival angle range estimated by the arrival angle range estimation section, and the transmission section feeds to the antennas selected by the transmission antenna selection section transmission signals multiplied by the transmission weight vectors generated by the transmission weight vector generating section, and transmits the transmission signals. Thereby, the maximum gain direction of the transmission beam can be made to coincide with the desired wave arrival direction, and the average reception SNR can be maximized at the opposing-side station.

Another radio communication apparatus according to the invention comprises: a plurality of antennas disposed in a predetermined shape; beam forming section, connected to each antenna, for forming a plurality of beams having different directions of radiation; a plurality of delay profile estimation section each configured to estimate delay profiles representing arrival times of a desired wave and delay waves and received powers for each of received signals by the formed beams; arrival angle range estimation section configured to estimate an arrival angle range of the desired wave from the estimated delay profiles; transmission beam selection beams for selecting at least one of the beams which is to be used for transmission, on the basis of the estimated arrival angle range; and transmission section configured to transmit the transmission signals using the selected beam.

With this structure, like the above-describe one, an arrival angle range of a desired wave can easily be estimated by making use of a delay profile. It is possible to easily select an optimal transmission antenna based on a radio wave arrival direction in which reversibility is established between uplink and downlink. An average reception SNR and an average reception SIR can be enhanced at an opposing-side station.

In this basic structure, the radio communication apparatus may further comprise: arrival direction estimation section configured to estimate a direction of arrival of the desired wave from the arrival angle range estimated by the arrival angle range estimation section; and transmission weight vector generating section configured to generate such transmission weight vectors as to set a maximum gain direction of directivity in the estimated arrival direction.

In this case, the transmission beam selection section selects a plurality of beams included in the arrival angle range estimated by the arrival angle range estimation section, and the transmission section reflects on the beams selected by the transmission beam selection section transmission signals multiplied by the transmission weight vectors generated by the transmission weight vector generating section, and transmits the transmission signals. Thereby, the maximum gain direction of the transmission beam can be made to coincide with the desired wave arrival direction, and the average reception SNR and average reception SIR can be maximized at the opposing-side station.

In an embodiment, in the arrival direction estimation section, the arrival direction is detected by performing a scan using a predetermined scanning beam pattern within the arrival angle range estimated by the arrival angle range estimation section, and finding a maximum value of a reception output level obtained by the scan. Thereby, it is possible to easily estimate the arrival direction necessary for forming the transmission beam pattern for effecting maximum-gain radiation in the desired DOA.

In another embodiment of the arrival direction estimation section, the arrival direction is detected by performing a scan using a predetermined scanning null pattern within the arrival angle range estimated by the arrival angle range estimation section, and finding a minimum value of a reception output level obtained by the scan. Compared to the scan using the scanning beam pattern, the desired wave arrival direction can be estimated more precisely.

In still another embodiment of the arrival direction estimation section, the above two section are combined, and the arrival direction is detected by performing a scan using a predetermined scanning beam pattern and a scan using a predetermined scanning null pattern within the arrival angle range estimated by the arrival angle range estimation section, and finding a maximum value in difference between reception output levels obtained by the both scans. According to this method, compared to the arrival direction estimation method using only one of the beam pattern scanning and null pattern scanning, the error in estimation of the arrival direction can be reduced.

The transmission section may effect transmission by forming a transmission beam pattern which has a maximum gain in the arrival direction of the desired wave and has suppressed side lobes in directions other than the arrival direction of the desired wave. In this case, it is not always possible to maximize the average reception SIR at the opposing-side station. However, the beam capable of achieving high SIR can be formed even in a case where the arrival direction of interference waves varies over time. Moreover, since there is no need to use the high-resolution arrival direction estimation method for the null control, the amount of arithmetic calculations can be remarkably reduced.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings. In the following description, the radio communication apparatus of this invention is applied to a base station of a mobile radio communication system. The present invention, however, is applicable to a terminal station of the system with the same structure, and the same advantages are obtained. In the following description, it is assumed that this invention is applied to an FDD (Frequency Division Duplex) system. However, this invention is also applicable to a TDD (Time Division Duplex) system with the same structure.
(First Embodiment)

Figure 2:
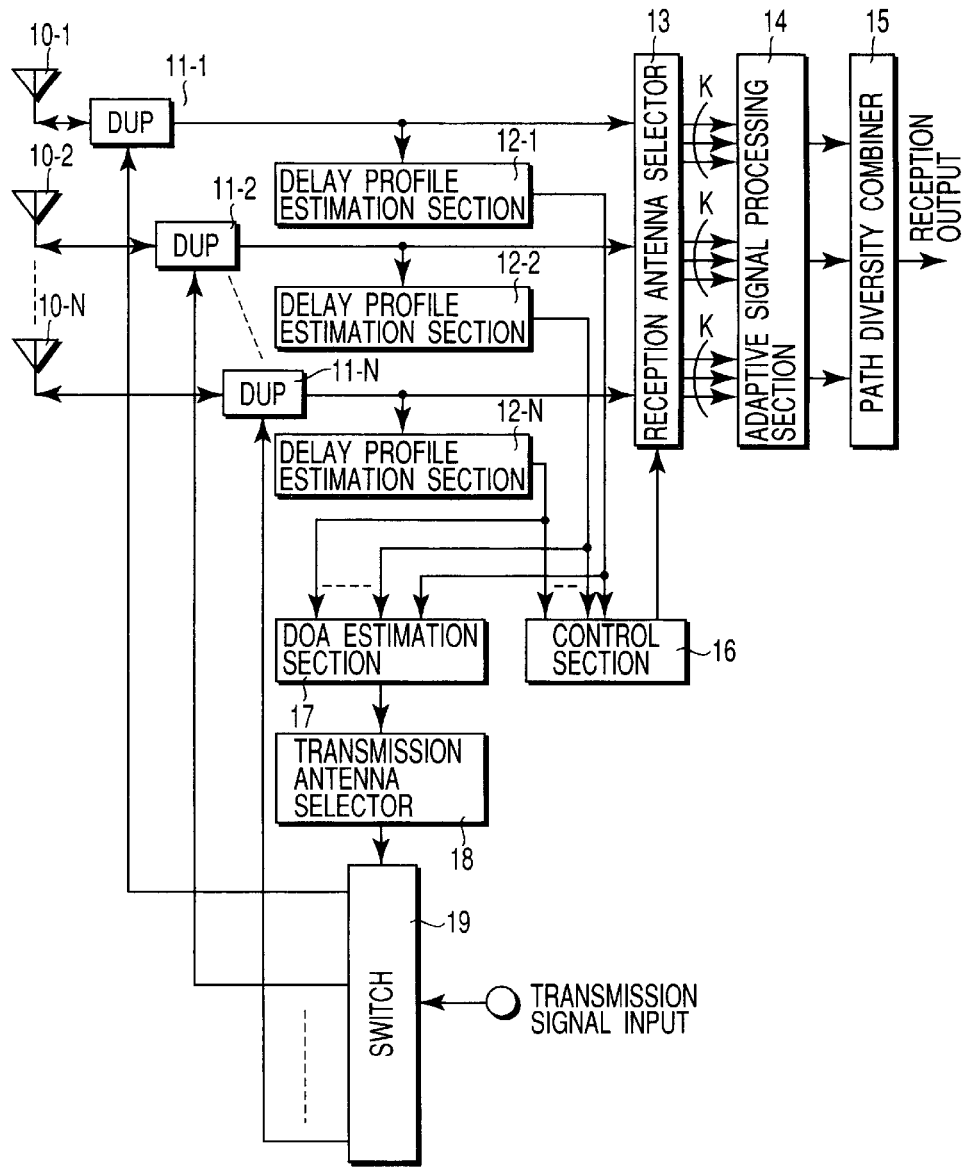
FIG. 2 is a block diagram showing the structure of a radio communication apparatus according to a first embodiment of the present invention.

FIG. 2 is a block diagram showing the structure of a radio communication apparatus according to a first embodiment of the present invention.

The radio communication apparatus of this embodiment comprises a plurality of antennas 10-1 to 10-N for transmission/reception, which have mutually different directivities; duplexers 11-1 to 11-N for dividing transmission/reception signals having different frequencies; delay profile estimation sections 12-1 to 12-N; a reception antenna selector 13 for selecting a predetermined number of antennas for reception (i.e. reception antennas) from the antennas 10-1 to 10-N; an adaptive signal processing section 14 and a path diversity combiner 15 for subjecting the received signals from the selected reception antennas to a temporal/spatial equalization signal processing; a control section 16 for controlling the reception antenna selector 13; a DOA (Direction of Arrival) estimation section (an arrival angle range estimation section) 17 for estimating a range of angles of arrival of a desired wave; a transmission antenna selector 18 for selecting one antenna for transmission (transmission antenna) from the antennas 10-1 to 10-N; and a switch 19 for supplying a transmission signal to the selected transmission antenna.

[Re: Reception Operation]

A reception operation of the radio communication apparatus will now be described. The antennas 10-1 to 10-N are disposed in a predetermined shape such as a circular shape. The antennas 10-1 to 10-N receive radio waves sent from opposing-side stations, that is, terminal stations, and output received signals. The received signals from the antennas 10-1 to 10-N are input to the reception antenna selector 13 via the duplexers 11-1 to 11-N.

In parallel with this, the delay profile estimation sections 12-1 to 12-N estimate delay profiles (average delay profiles) of associated received signals. The average delay profile in this context means measurement results of the arrival time and average received power of a desired wave and a delay wave thereof.

Each of the delay profile estimation sections 12-1 to 12-N is realized by a sliding correlator, etc., and it can also be realized by a matched filter, etc. in a CDMA (Code Division Multiplex Access) system, etc. Since the frequency band is spread by spreading codes in the CDMA, the delay profile can be estimated by an inverse-number interval of a chip rate. In addition, in a modulation/demodulation system wherein the effect of filtering can be ignored, the temporal resolution can be enhanced by a sliding correlator in which taps are disposed at intervals of fractions.

On the basis of the average delay profiles estimated by the delay profile estimation sections 12-1 to 12-N, the reception antenna selector 13 is controlled by the control section 16 so as to select optimal reception antennas for desired wave components with respective delay times. In the case of the structure of the present embodiment wherein the temporal/spatial equalization processing is performed by the adaptive signal processing section 14 and path diversity combiner 15 at the rear stage of the reception antenna selector 13, the delay wave can be regarded as the desired wave which has traveled through different propagation paths.

In this way, the control signal from the control section 16 enables the reception antenna selector 13 to select optimal reception antennas for desired wave components with associated delay times. The received signals from the selected reception antennas are subjected to the spatial equalization processing, such as adaptive array processing, in the adaptive signal processing section 14, and then to the temporal equalization processing in the path diversity combiner 15.

The operations of the reception antenna selector 13, adaptive signal processing section 14 and path diversity combiner 15 are described in Jpn. Pat. Appln. KOKAI Publication No. 10-256821. These operations may be summarized as follows.

The reception antenna selector 13 selects K (K<N) reception antennas with higher received powers from N antennas 10-1 to 10-N for desired wave components with respective delay times (for simpler description, assume three waves: (1) a direct wave with no delay, (2) a 1-symbol delay wave and (3) a 2-symbol delay wave). The received signals from the selected reception antennas are supplied to the adaptive signal processing section 14.

Figure 1:
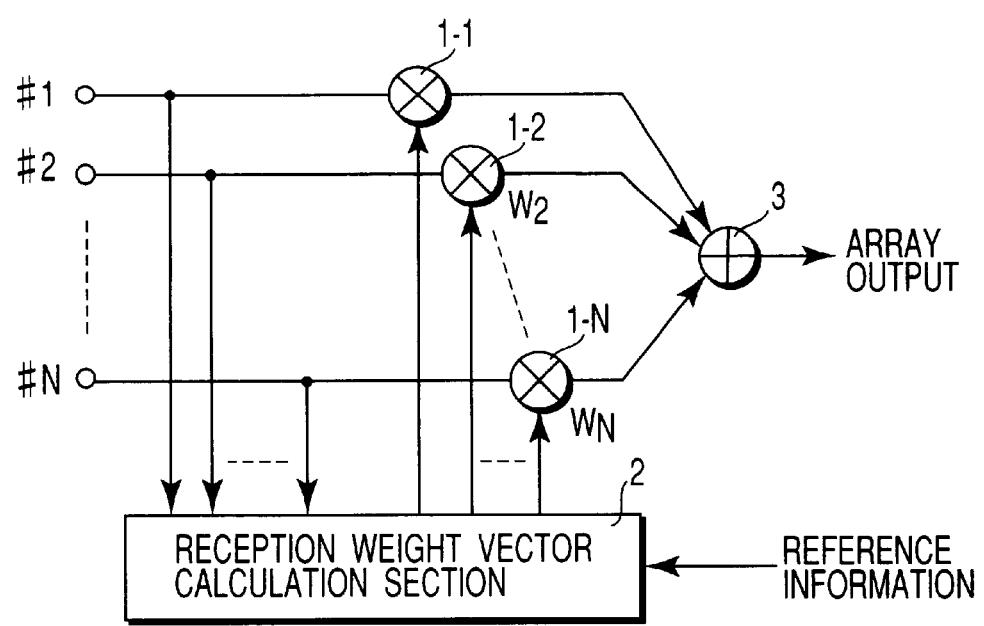
FIG. 1 shows the structure of a conventional receiving adaptive array antenna.

For example, with the same structure as shown in FIG. 1, the adaptive signal processing section 14 performs the spatial equalization signal processing by subjecting to a weighted addition processing each received signal from the K reception antennas selected for the desired wave components with associated delay times. The weight vectors used in this case are so determined as to increase the desired wave component in the received signals and to suppress other interference components. In this way, the adaptive signal processing section 14 produces output signals with enhanced powers of the desired wave components in the received signals with respective delay times (i.e. direct wave, 1-symbol delay wave and 2-symbol delay wave). The three output signals from the adaptive signal processing section 14 are supplied to the path diversity combiner 15.

The path diversity combiner 15 effects relative temporal matching of the received signals with respective delay times, which have been subjected to the spatial equalization signal processing, by performing time correction of the 1-symbol delay wave and 2-symbol delay wave with reference to the direct wave. Then, the temporal equalization signal processing is effected by synthesizing the resultant signals by an in-phase synthesis method or a maximum ratio synthesis method. The path diversity combiner 15 may be replaced with an adaptive equalizer, etc. There is no problem if a temporal equalization processing can be performed.

[Re: Transmission Operation]

The transmission operation will now be described. At the time of the transmission, like the above-described reception, the delay profile estimation sections 12-1 to 12-N estimate delay profiles. On the basis of the estimated delay profiles, the DOA estimation section 17 estimates an arrival angle range of a desired wave. The arrival angle range in this context means an approximate direction of arrival of desired signals, that is, a range of angles at which a desired wave is expected to come. In this embodiment, in consideration of the directivities of the antennas, average received powers of a desired wave in all delay profiles are simply compared, thereby to estimate the arrival angle range.

The delay profiles are indispensable in the temporal/spatial equalization signal processing at the time of reception. Using the delay profiles, the arrival angle range of a desired wave can be limited to some degree without performing complex calculations. On the basis of the estimated arrival angle range, the transmission antenna selector 18 selects, as transmission antennas, those of the antennas 10-1 to 10-N, which has received the delay waves at maximum power at each delay wave. Based on the information from the transmission antenna selector 18, the switch 19 is operated and transmission signals are fed to the selected transmission antennas.

Figure 3:
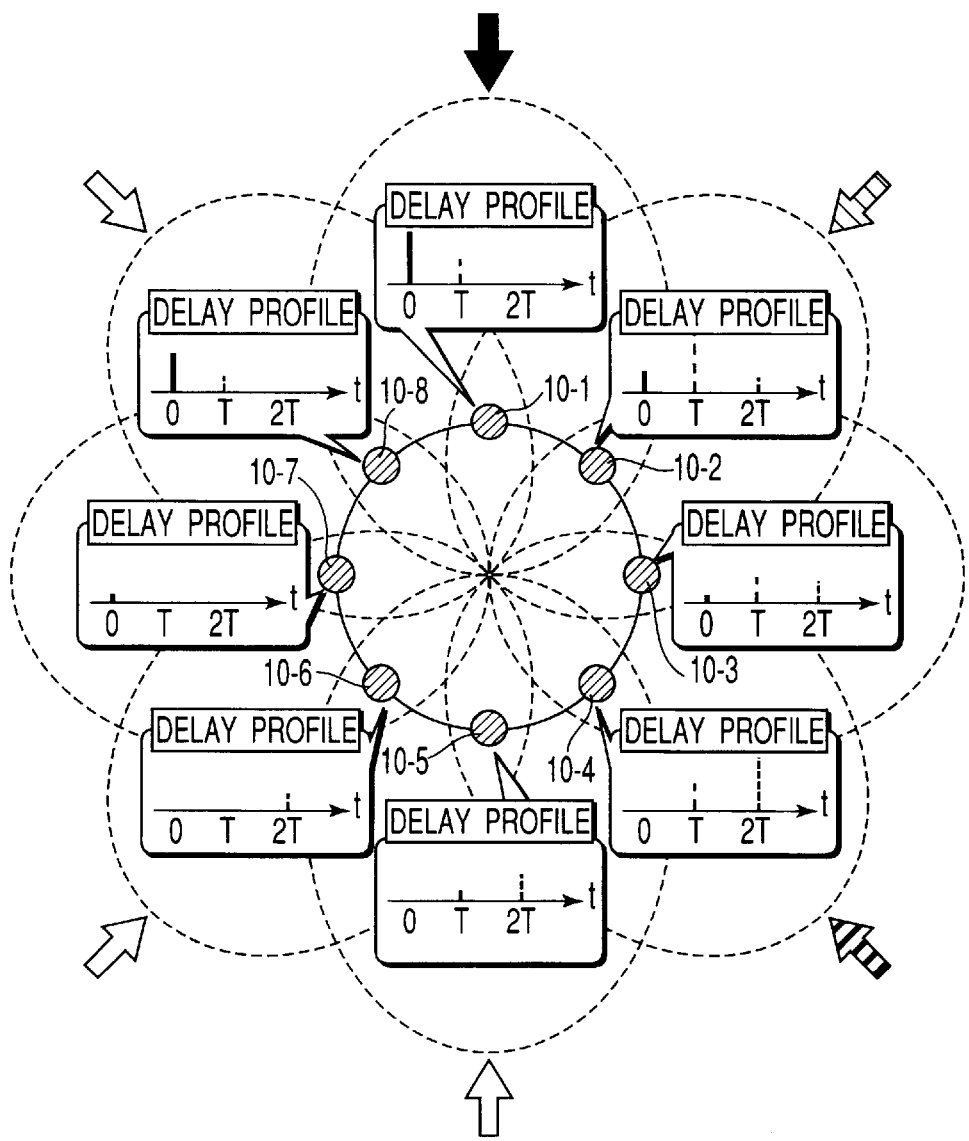
FIG. 3 shows an example of states of arrival waves and delay profiles.

An example of a specific operation mode of the present embodiment will now be described. FIG. 3 shows an example of states of arrival waves and delay profiles in a case where radio waves have been received by the antennas 10-1 to 10-N. In FIG. 3, a desired wave (direct wave), a 1-symbol delay wave, a 2-symbol delay wave, and an interference wave (co-channel interference wave) have arrived at the antennas 10-1 to 10-N. Assume that delay profiles of average received powers at intervals of symbol time T are estimated as shown in FIG. 3.

As the antennas 10-1 to 10-N, eight directional antennas are disposed in a circle such that their directivity patterns are directed radially outward from the center of the array. The directivity is a cosine beam pattern, and the beam half-value width is 90°. Thus, adjacent beams overlap each other.

In FIG. 3, only the antennas 10-1, 10-2 and 10-3 receive the desired wave (direct wave). If the average power delay profiles of these antennas are compared, the received power value of the antenna 10-1 is highest. Thus, the switch 19 is controlled by the transmission antenna selector 18, and the antenna 10-1 is used as the transmission antenna for transmitting radio waves.

In the mobile radio communication system, as mentioned above, the reversibility is established between the uplink (terminal station→base station) and downlink (base station→terminal station) with respect to the radio wave arrival direction. Accordingly, if the received power value of the antenna 10-1 in the downlink is highest, the terminal station in the downlink receives the radio wave from the antenna 10-1 as the wave with the highest received power value. Therefore, if the base station transmits radio waves via the antenna 10-1 having the highest received power value, the reception SNR at the terminal station is enhanced.

According to the present embodiment, in the mobile radio communication system using different frequencies for the uplink and downlink, too, the radio communication apparatus of the base station using the adaptive antenna can easily select optimal antennas and can send radio waves to the terminal station. Thus, the reception SNR at the terminal station can be enhanced by the diversity effect based on directivity diversity.

Moreover, the arrival angle range of the desired wave can easily be estimated only by using the delay profiles of the received signals of the antennas, which have already been measured for the temporal/spatial equalization processing, and observing the power value of each delay wave. Based on the estimated arrival angle range, the optimal transmission antennas can be quickly selected with simple processing with respect to the radio wave arrival direction ensuring reversibility between the uplink and downlink. This embodiment is particularly effective in the system requiring high-speed processing, and also effective as a solution to the problem of shadowing.

(Second Embodiment)

Figure 4:
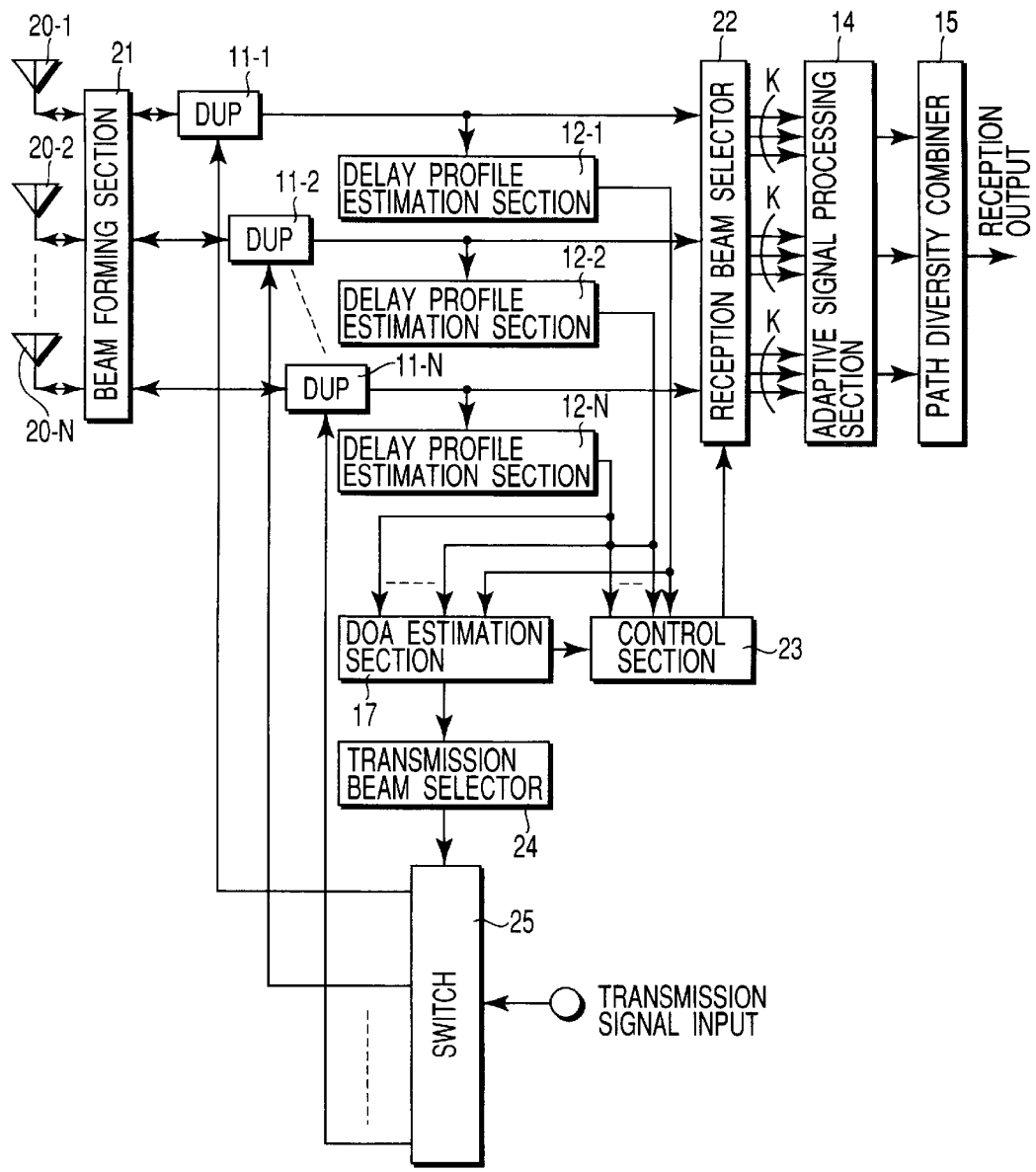
FIG. 4 is a block diagram showing the structure of a radio communication apparatus according to a second embodiment of the present invention.

FIG. 4 shows the structure of a radio communication apparatus according to a second embodiment of the invention. The structural elements common to those in FIG. 2 are denoted by like reference numerals, and only differences from the first embodiment will be described.

In the second embodiment, omni-directional antennas 20-1 to 20-N are substituted for the directional antennas 10-1 to 10-N used in the first embodiment. A beam forming section 21 is connected between the antennas 20-1 to 20-N and the duplexers 11-1 to 11-N. The beam forming section 21 forms a plurality of beams with different directions of radiation (i.e. different directivities), that is, a plurality of directivity patterns. The beam forming section 21 may be realized, for example, by a Butler matrix circuit using analog elements, or a digital circuit performing spatial FFT (Fast Fourier Transform).

Since the beam forming section 21 is used, the reception antenna selector 13 in FIG. 2 is replaced with a reception beam selector 22 controlled by a control section 23, and the transmission antenna selector 18 in FIG. 2 is replaced with a transmission beam selector 24. The transmission beam selector 24 controls a switch 25.

[Re: Reception Operation]

A reception operation of the radio communication apparatus according to this embodiment will now be described. The received signals from the antennas 20-1 to 20-N are input to the beam forming section 21, and a plurality of beams with different directions of radiation are formed. The received signals from the beam forming section 21, which are associated with the respective beams, are input to the reception beam selector 22 via the duplexers 11-1 to 11-N. In parallel with this, the delay profile estimation sections 12-1 to 12-N estimate average delay profiles of the associated received signals.

On the basis of the average delay profiles estimated by the delay profile estimation sections 12-1 to 12-N, the reception beam selector 22 is controlled by a control signal from the control section 23 so as to select optimal reception beams for desired wave components with associated delay times. The received signals from the selected reception beams are subjected to the spatial equalization processing, such as adaptive array, in the adaptive signal processing section 14, and then to the temporal equalization processing in the path diversity combiner 15.

[Re: Transmission Operation]

At the time of the transmission, like the above-described reception, on the basis of the delay profiles estimated by the delay profile estimation sections 12-1 to 12-N, the DOA estimation section 17 estimates an arrival angle range of a desired wave. On the basis of the estimated arrival angle range, the transmission beam selector 24 selects, as transmission beams, only those of the beams formed by the beam forming section 21, which have received the delay waves at maximum power. Based on the information from the transmission beam selector 24, the switch 25 is operated and transmission signals are fed to the beam forming section 21 so that the transmission signals may be sent out with the selected transmission beams.

According to this embodiment, the beam with high SNR is selected as the reception beam from the plural beams, and the selected beam is used for signal reception. Thus, the reception characteristics at the base station are improved, and if the same beam is used for a transmission beam, the average reception SNR can be improved at the terminal station.

(Third Embodiment)

Figure 5:
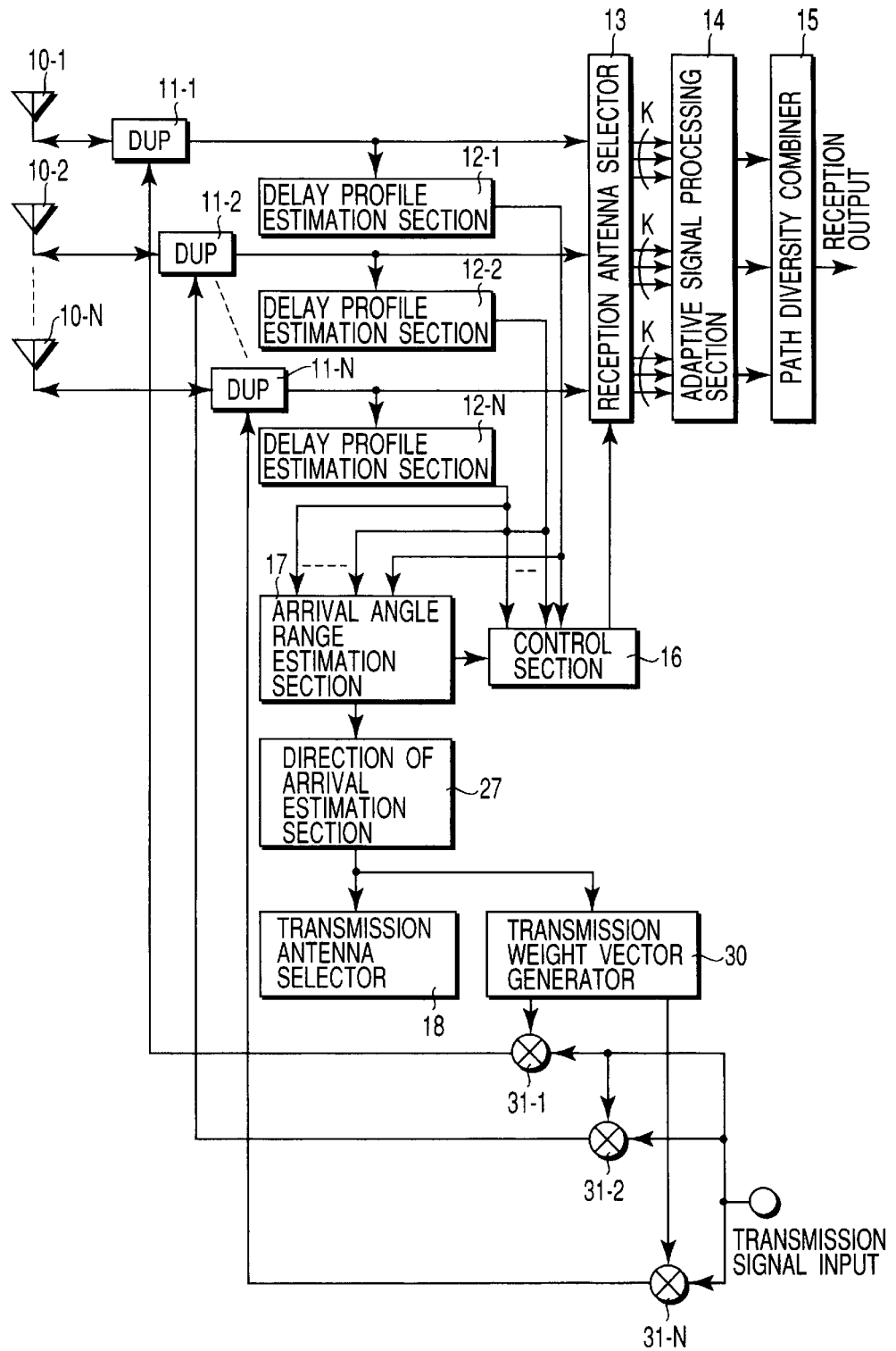
FIG. 5 is a block diagram showing the structure of a radio communication apparatus according to a third embodiment of the present invention.

FIG. 5 shows the structure of a radio communication apparatus according to a third embodiment of the invention. This embodiment is based on the structure of the first embodiment, and it aims at forming a transmission beam pattern capable of effectively enhancing an average reception SIR at an opposing-side station, or a terminal station.

The structural elements common to those in FIG. 2 are denoted by like reference numerals, and only differences from the first embodiment will be described. In the third embodiment, a direction of arrival estimation section 27 for estimating a direction of arrival of a desired wave is provided in addition to the arrival angle range estimation section 17 for estimating an arrival angle range of a desired wave in the first and second embodiments. In addition, a transmission weight vector generator 30 is added, and the switch 19 in FIG. 2 is replaced with weighting sections (multipliers) 31-1 to 31-N.

[Re: Reception Operation]

A reception operation in the third embodiment is the same as that in the first embodiment. The received signals from the antennas 10-1 to 10-N are input to the reception antenna selector 13 via the duplexers 11-1 to 11-N. In parallel with this, the delay profile estimation sections 12-1 to 12-N estimate delay profiles of the associated received signals.

On the basis of the delay profiles estimated by the delay profile estimation sections 12-1 to 12-N, the reception antenna selector 13 is controlled by the control signal from the control section 16 so as to select optimal beams for desired wave components with associated delay times. The received signals from the selected beams are subjected to the spatial equalization processing, such as adaptive array processing, in the adaptive signal processing section 14, and then to the temporal equalization processing in the path diversity combiner 15.

[Re: Transmission Operation]

At the time of transmission, like the reception, on the basis of the delay profiles estimated by the delay profile estimation sections 12-1 to 12-N, the arrival angle range estimation section 17 estimates an arrival angle range $\Phi$ which is an approximate direction of arrival of a desired wave. Specifically, like the preceding embodiments, the arrival angle range estimation section 17 first compares desired wave component powers in all the delay profiles and finds the arrival angle range Φ from the directivities of the antennas 10-1 to 10-N.

Once the arrival angle range Φ is found by the arrival angle range estimation section 17, the antennas having directivities with no gain in the arrival angle range Φ are regarded as non-associated antennas, and these are excluded from the candidates by the transmission antenna selector 18. Thus, the associated transmission antennas are selected.

Subsequently, in order to improve the precision of estimation of the direction of arrival of the desired wave, the direction of arrival estimation section 27 finds a DOA φ of the desired wave, which is more precise than the arrival angle range Φ. This is effected by performing a beam scan and a null pattern scan (to be described later) after the arrival angle range Φ is specified from the comparison of the desired wave received powers in the delay profiles, as mentioned above.

Based on the DOA φ estimated by the direction of arrival estimation section 27, the transmission weight vector generator 30 determines transmission weight vectors to direct a maximum gain direction of the directivity (transmission beam) at the time of transmission in the direction φ. The weighting sections 31-1 to 31-N multiply the transmission signal by these weight vectors. Thus, a transmission signal sequence for the transmission antennas selected by the transmission antenna selector 18 is generated and sent out with the optimal transmission beam pattern.

The transmission beam pattern to be formed will now be considered.

A null pattern is very sensitive to the DOA of received signals since it causes a gain decrease dynamically relative to the angle. By contrast, a main lobe has a relatively large beam width, and a gain decrease thereof from the peak is gentle relative to the variation in angle. It is thus considered that the main lobe has a high robustness in a case where the estimation precision of DOA is low, a peak error of the beam occurs due to a defective calibration of the transmission circuit, or the DOA differs between the reception mode and transmission mode due to movement of the terminal station or a variation in environment.

Accordingly, it is considered that the transmission beam gain is not greatly decreased in the direction of arrival (DOA) of the desired wave, even if the arrival angle range estimation section 17 and direction of arrival estimation section 27 estimate the DOA φ of the desired wave by a method with low estimation precision but with a much less amount of calculations than MUSIC, and the vector generator 30 generates transmission weight vectors based on the estimated DOA φ to weight the transmission signal, thereby to form the transmission beam pattern.

Moreover, if a transmission beam pattern, which has very low side lobes at angles other than the angle of the main lobe in the DOA of the desired wave, is formed, the radiation gain in the directions of interfering stations can be decreased to some extent, if not an optimal level.

From the above, it should suffice if the transmission weight vectors are determined so as to form a transmission beam pattern which has the beam center (corresponding to the DOA φ) included in the arrival angle range Φ of the desired wave. This transmission beam pattern should have such a beam width that the radiation gain in the arrival angle range Φ is a threshold $G_U$ [dB] or above, and should have the radiation gain in side lobes which is less than a threshold $G_L$ [dB]. The thresholds $G_U$ and $G_L$ are parameters depending on the number of antennas, antenna directivities, array structure, estimation precision of power delay profiles, etc. This transmission beam pattern can easily be obtained, for example, by weighting the Chebyshev distribution toward the DOA φ of the desired wave.

How to estimate the DOA (arrival angle range and direction of arrival) of the desired wave and determine the transmission beam pattern based on the estimated DOA will now be described.

In the example shown in FIG. 3, only antennas 10-1, 10-2 and 10-8 receive desired wave components. If the delay profiles (average delay profiles) of the respective desired wave components are compared, the received power value of the antenna 10-1 is highest, and the received power values of the antennas 10-2 and 10-8 are second highest and substantially equal.

Since the intervals of antennas 10-1 to 10-N are relatively small (about half wavelength), the fading correlation of received signals among the antennas 10-1 to 10-N is very high. Thus, the received signal power values are considered to be substantially equal, and a difference in received power value among the delay profiles occurs due to the directivities of antennas 10-1 to 10-N.

In addition, since the directivity of antennas 10-1 to 10-N is symmetric between the right and left sides, it can be estimated that the desired wave comes substantially from the front side of the antenna 10-1 (assuming $\phi_0=0°$, the angle increasing clockwise). Accordingly, in this case, it should suffice if a transmission beam pattern with the center at $\phi_0=0°$ and the beam width at Φ=−11° to 11° is formed.

Similarly, Φ=45° to 67° with respect to the 1-symbol delay wave, and Φ=124° to 146° with respect to the 2-symbol delay wave. Transmission beam patterns with the centers at $\phi_1=56°$ and φhd 2=135° and the beam width at about 22.5° may be formed for the 1-symbol delay wave and 2-symbol delay wave.

The preciseness of estimation of the arrival angle Φ estimated by the arrival angle range estimation section 17 depends on the reliability of the received power value estimated from the delay profiles. If the effect of noise is negligible, the arrival angle Φ can be made more precise by finding the difference in received power value among the antennas 10-1 to 10-N when the desired wave is received.

As has been described above, in the third embodiment, like the first embodiment, the K (K<N) directional antennas are selected based on the arrival angle range Φ estimated by the arrival angle range estimation section 17. The transmission signal to be supplied to the K directional antennas is weighted by the transmission weight vectors for setting the maximum gain direction of the transmission beam at the direction of arrival (DOA) φ of the desired wave, which is estimated by the direction of arrival estimation section 27. Thereby, the transmission beam pattern having a high directivity in the maximum gain direction and having suppressed side lobes can be formed, and the average reception SIR at the terminal station can be improved. Moreover, high robustness is provided against a variation in directions of arrival of the desired wave and interference wave.

Note that, to determine the transmission weight vectors, outputs of the arrival angle range estimation section 17 and direction of arrival estimation section 27 are used in the third embodiment. However, to determine the transmission weight vectors, the only output of arrival angle range estimation section 17 may be used.

(Fourth Embodiment)

Figure 6:
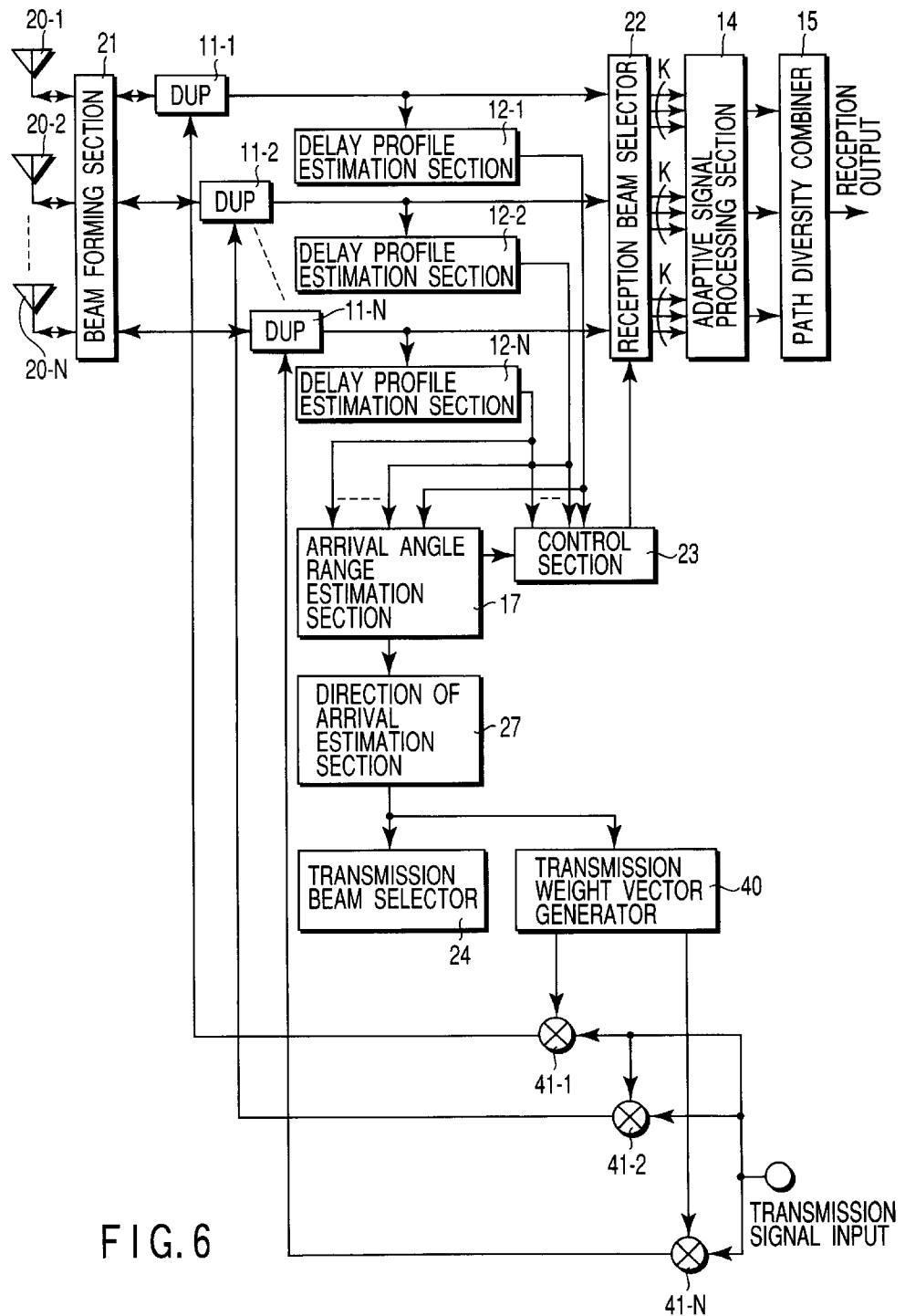
FIG. 6 is a block diagram showing the structure of a radio communication apparatus according to a fourth embodiment of the present invention.

FIG. 6 shows the structure of a radio communication apparatus according to a fourth embodiment of the invention. This embodiment is based on the structure of the second embodiment. Using the same principle of the third embodiment, the fourth embodiment aims at forming a transmission beam pattern capable of effectively enhancing an average reception SIR at an opposing-side station, or a terminal station.

The structural elements common to those in FIG. 4 are denoted by like reference numerals, and only differences from the second embodiment will be described. In the fourth embodiment, a direction of arrival estimation section 27 for estimating a direction of arrival of a desired wave is provided in addition to the arrival angle range estimation section 17 for estimating an arrival angle range of a desired wave in the first and second embodiments. In addition, a transmission weight vector generator 40 is added, and the switch 25 in FIG. 4 is replaced with weighting sections (multipliers) 41-1 to 41-N.

[Re: Reception Operation]

A reception operation of this embodiment is the same as that of the second embodiment. The received signals from the antennas 20-1 to 20-N are input to the beam forming section 21, and a plurality of beams are formed. The received signals from the beam forming section 21, which are associated with the respective beams, are input to the reception beam selector 22 via the duplexers 11-1 to 11-N. In parallel with this, the delay profile estimation sections 12-1 to 12-N estimate average delay profiles of the associated received signals.

On the basis of the delay profiles estimated by the delay profile estimation sections 12-1 to 12-N, the reception beam selector 22 is controlled by the control signal from the control section 23 so as to select optimal reception beams for desired wave components with associated delay times. The received signals from the selected reception beams are subjected to the spatial equalization processing, such as adaptive array processing, in the adaptive signal processing section 14, and then to the temporal equalization processing in the path diversity combiner 15.

[Re: Transmission Operation]

At the time of transmission, like the third embodiment, on the basis of the delay profiles estimated by the delay profile estimation sections 12-1 to 12-N, the arrival angle range estimation section 17 estimates an arrival angle range $\Phi$ which is an approximate direction of arrival of a desired wave. The beams having directivities with no gain in the arrival angle range $\Phi$ are excluded from the candidates by the transmission beam selector 24. Thus, the associated transmission beams are selected.

Subsequently, the direction of arrival estimation section 27 finds a direction of arrival $\phi$ of the desired wave, which is more precise than the arrival angle range $\Phi$. Based on the DOA $\phi$, the transmission weight vector generator 40 determines transmission weight vectors for setting a maximum gain direction of the directivity (transmission beam) at the time of transmission to confirm to the direction $\phi$. The weighting sections 41-1 to 41-N multiply the transmission signal by these weight vectors. Thus, a transmission signal sequence for the transmission beam selected by the transmission beam selector 24 is generated and sent out with the optimal transmission beam pattern.

According to this embodiment, the beams with high SNR are selected from the plural beams as the reception beams, and the selected beams are used for reception. Thereby, the reception characteristics at the base station are improved. In addition, the same reception beams are used as transmission beams, and the transmission beams are synthesized to form an optimal transmission beam pattern. Thus, the average reception SIR can be further improved at the terminal station.

Note that, to determine the transmission weight vectors, outputs of the arrival angle range estimation section 17 and direction of arrival estimation section 27 are used in the third embodiment. However, to determine the transmission weight vectors, the only output of arrival angle range estimation section 17 may be used.

(Fifth Embodiment)

A fifth embodiment of the invention, which relates to a DOA estimation method, will now be described with reference to FIGS. 7A to 7F.

In the present invention, where a sufficient angular resolution is not obtained with the above-described DOA estimation method, a beam pattern scan or a null pattern scan may be used as a DOA estimation method with a less amount of calculations, which is a substitute for the MUSIC.

According to the DOA estimation using the beam pattern scan, a weighting corresponding to an angular sweep is attempted for received signals and thus a more exact DOA can be estimated. For example, in the first and third embodiments using the directional antennas 10-1 to 10-N, some antennas having high gains in the arrival direction can be specified from the delay profiles of received signals from the directional antennas 10-1 to 10-N. Thus, two of those antennas, which have the highest received powers, may be used to form a scanning beam pattern. In the example shown in FIG. 3, with respect to the desired wave, a scanning beam pattern is produced using the antennas 10-1 and 10-2.

Based on this scanning beam pattern, an angular sweep is performed. That is, a beam scan is performed at proper angular intervals within the initially estimated arrival angle range $\Phi$. As a result of the scan using the scanning beam pattern, the direction in which the reception output level corresponding to the scanning beam pattern takes a maximum value is estimated to be the arrival direction $\phi$ of the desired wave. If the angular scan is performed too finely, the processing time and the amount of calculations become two large. It is thus preferable to discretely perform the angular sweep at such angular intervals as to make negligible the gain degradation from the peak in relation to the width of the main lobe of the scanning beam pattern.

Normally, if the above beam pattern scan is performed in a horizontal plane over 360°, distinction between the side lobe, grating lobe, etc. is difficult. In this invention, however, the estimated reception wave arrival direction $\Phi$ is limited in advance. Thus, the scan range can be narrowed and the desired wave direction can be exactly estimated by a less number of attempts.

Figure 7A:
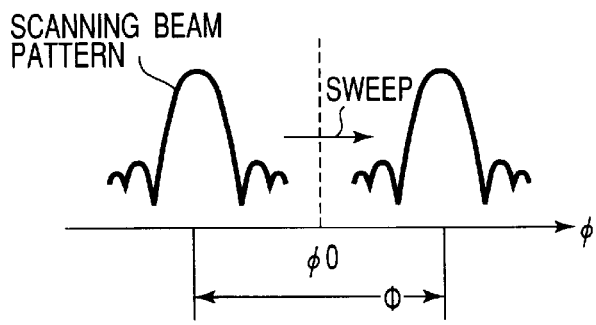
FIGS. 7A to 7F show states of estimation of the direction of arrival (DOA) by a beam pattern scan and a null pattern scan according to a fifth embodiment of the invention.
Figure 7B:
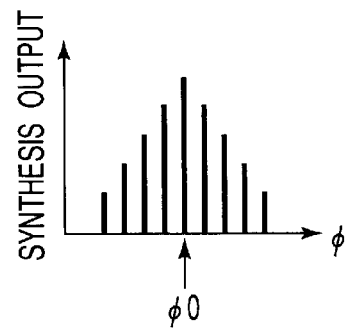

FIGS. 7A and 7B show states in which the estimation of the direction is performed using the beam pattern scan. FIG. 7A shows a scanning beam pattern formed by using two antennas. FIG. 7B shows a hysteresis of the reception output level (the synthesis output of two antennas) obtained where this scanning beam pattern is angular-swept over the arrival angle range $\Phi$. From FIG. 7B, the desired wave arrival direction $\phi_0$ is found as an angle at which the reception output level takes a maximum value.

In this way, the arrival direction $\phi$ can be estimated by simple arithmetic operations, the arrival direction $\phi$ can be made to completely coincide with the maximum gain direction (peak direction) of the transmission beam, and the maximum SNR is realized at the terminal station.

Figure 7C:
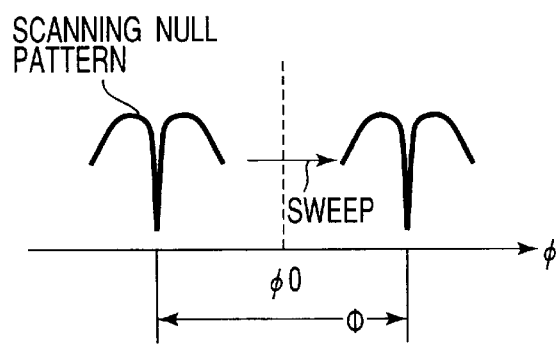
Figure 7D:
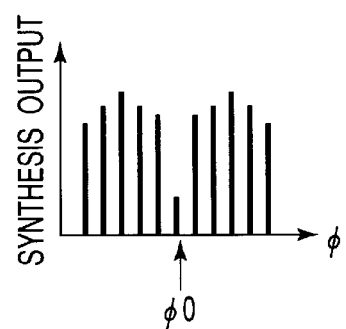

It is also possible to apply an angular sweep method wherein a scanning null pattern having a null is formed by using two antennas, as shown in FIG. 7C. In this case, a hysteresis of the reception output level (the synthesis output of two antennas) corresponding to the scanning null pattern is shown in FIG. 7D. The angle at which the reception output level takes a minimum value is estimated as the desired wave arrival direction $\phi_0$.

If the scan is performed using the scanning null pattern, the minimum value can easily be specified since the null drops steeply even in such a case that there would be no difference in reception output level due to the scanning beam width in the beam pattern scanning and the arrival direction cannot be specified. Thus, the desired wave arrival direction $\phi_0$ can easily be estimated.

Figure 7E:
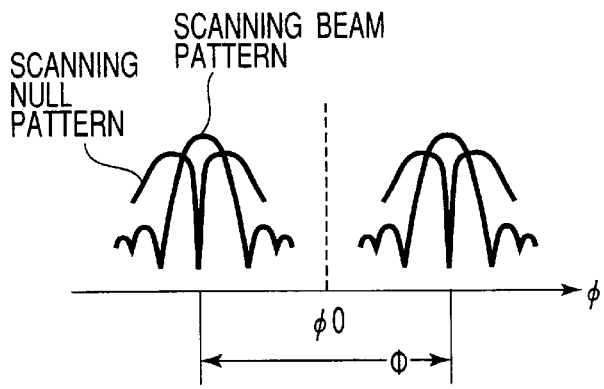
Figure 7F:
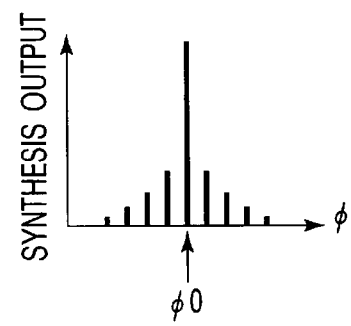

Moreover, the above-described beam pattern scan and null pattern scan may be performed simultaneously, as illustrated in FIG. 7E. A difference between reception output levels corresponding to the two patterns is found, as shown in FIG. 7F, and the angle at which the difference is greatest is estimated as the desired wave arrival direction $\phi_0$.

With this technique, the arrival direction can be estimated more precisely since the effect of noise, delay wave, interference wave, etc. is suppressed. Furthermore, since this method is equivalent to the case where the above-described arrival angle range $\Phi$ of the desired wave is excessively decreased, a narrow beam with a higher gain at the beam center of the beam pattern can be formed.

If the angular sweep is always performed from the end fire direction of the directional antenna, there may arise a case where much time is needed to obtain a minimum value in reception output level. However, if the minimum value search according to a two-division method is repeatedly attempted, the desired wave arrival direction can be estimated more quickly with a less amount of calculations.

(Sixth Embodiment)

A sixth embodiment of the invention, which relates to a DOA estimation method different from that of the fifth embodiment, will now be described with reference to FIG. 8. The method to be described below is applicable to all the arrival angle range estimation sections 17 and direction of arrival estimation section 27 of the radio communication apparatuses according to the first to fourth embodiments. Assume, however, that the method is applied to the radio communication apparatus according to the third embodiment as shown in FIG. 5.

In the DOA estimation method described in connection with the fifth embodiment, there is a case where the DOA cannot exactly be estimated when high-level delay waves come from the vicinity of the direction of the desired wave. In such a case, replicas of received signals, wherein propagation channel responses (complex amplitude phase distortion components) due to the desired arrival wave are convoluted, are generated from the delay profile estimation values of the two antenna elements covering the estimated arrival direction range. The generated replica of received signals are subjected to the null pattern scan, etc. which is the arrival direction estimation method described in the fifth embodiment. Thereby, the error in DOA estimation of the desired wave and delay waves can be reduced.

Figure 8:
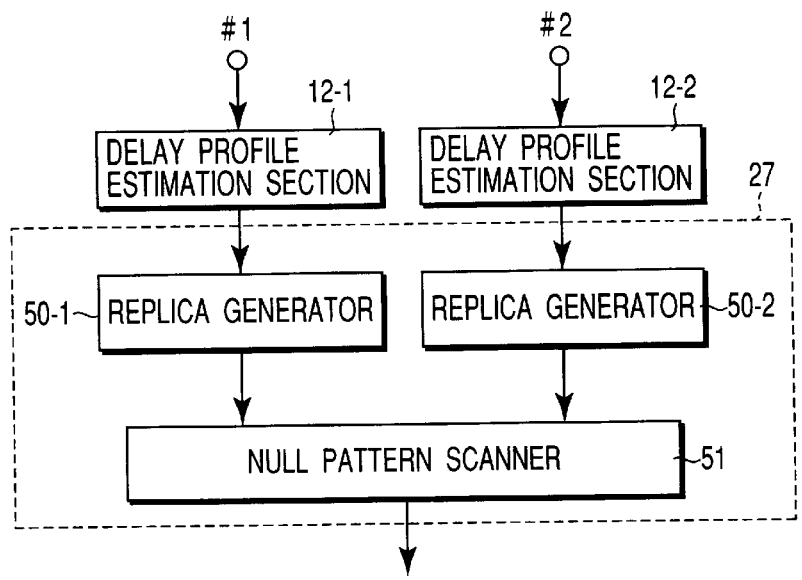
FIG. 8 is a block diagram showing the structure of a DOA estimation section according to a sixth embodiment of the invention.

FIG. 8 shows the structure of the DOA estimation section of the radio communication apparatus according to the sixth embodiment of the invention.

The operational principle will now be described with reference to FIG. 8. In FIG. 8, #1 and #2 denote two elements having higher received powers of delay waves with a delay time $\tau_i$. Two received signals are input to the delay profile estimation sections 12-1 and 12-2, and delay profiles are estimated. Based on the delay profiles, replica generators 50-1 and 50-2 generate reception replica signals of delay waves to be desired.

Then, the arrival direction is estimated from the reception replica signals of the two elements by a null pattern scanner 51. The exact scan determination can be made by performing the null pattern scan using the reception replica signals containing only the specific delay wave components. In FIG. 8, the null pattern scanner may be replaced with a beam pattern scanner.

The replica of received signals can be generated for the desired wave and each delay wave, according to the following principle. A received signal $x_j(t)$ of a j-th antenna element is given by $$x_j(t) = \sum_{i=1}^{L} h_j(t)s(t-\tau_i) + n(t) \qquad (4)$$

wherein $h_j(t)$ indicates a propagation path response containing an array response in the j-th antenna element, $\tau_i$ is a delay time (I=1 to L) of an I-th delay wave, s(t) is a transmission signal sequence (PN sequence), and n(t) is noise in the receiver.

If a complex conjugate of a known sequence, which is the same as that of the transmission signal, is convoluted in the received signal in order to find a delay profile, the following is given:

$$\int_{-\infty}^{\infty} x_j(t)s^*(\tau-t)d\tau = \sum_{i=1}^{L} \hat{h}_j(t)\delta(t-\tau_i) \qquad (5)$$

wherein $\hat{h}_j(t)$ is an estimated complex delay profile.

Therefore, the reception replica signal of the i-th delay wave of the j-th antenna element is found by $$r_{i,j}(t) = \hat{h}_j(t)s(t-\tau_i) \qquad (6)$$

With the above structure, the error of DOA estimation using the null pattern scan can be reduced.

Where the transmission beam is formed using the transmission weight vectors for setting the null in the estimated delay wave direction, the delay component reaching the terminal can be reduced. Thereby, frequency selective fading at the terminal can be prevented. As a weight vector determination algorithm for thus directing the null, there is known, for instance, a DCMP (Directional Constraint Minimum Power) algorithm with which a desired beam pattern is obtained by imposing a constraint to the known arrival direction.

(Seventh Embodiment)

Figure 9:
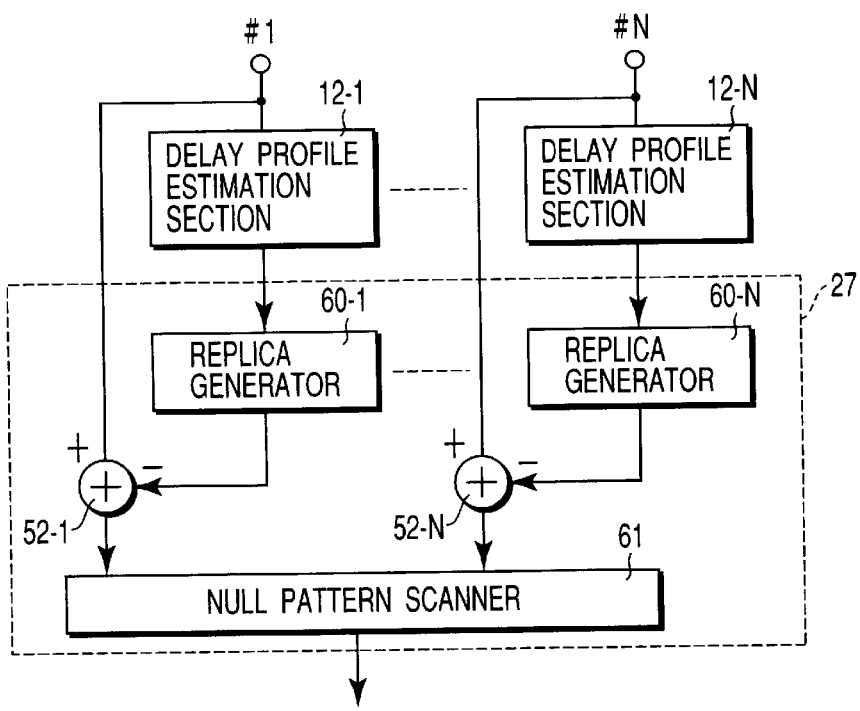
FIG. 9 is a block diagram showing the structure of a DOA estimation section according to a seventh embodiment of the invention.

A seventh embodiment of the invention, which relates to a DOA estimation method different from that of the fifth embodiment, will now be described with reference to FIG. 9.

With the DOA estimation method described in connection with the fifth and sixth embodiments, there is a case where the DOA cannot exactly be estimated when incoming high-level interference waves vary over time in a communication system using an access method such as SDMA (Space Division Multiple Access) or CDMA (Code Division Multiple Access).

A DOA estimation method applicable to a case where high-level interference waves are present will now be described.

The operational principle will now be described with reference to FIG. 9. An N-number of received signals from respective antenna elements are input to the delay profile estimation sections 12-1 to 12-N, and delay profiles are estimated. Based on the delay profiles, replica generators 60-1 to 60-N generate reception replica signals of the desired wave and all delay waves. The reception replica signals of the desired wave and each delay wave are generated by the same method as described above.

The reception replica signals of the desired wave and all delay waves are synthesized and subtracted from the received signals by the adders 52-1 to 52-N. Thus, received signals containing the interference wave components alone are obtained.

A null pattern scanner 61 estimates the interference wave arrival direction with respect to all combinations of adjacent two of the antenna elements associated with the N received signals. When the interference wave arrival direction is to be estimated, if it is sufficient to find the arrival direction of interference waves only within the desired wave arrival angle range, the interference wave arrival direction may be estimated using the antenna within the desired wave arrival angle range.

With the above method, the interference wave direction is estimated. In addition, if the transmission beam pattern for setting the null in the estimated interference wave direction is formed, the reception SIR at the terminal station can be improved in the communication system, such as SDMA or CDMA, where many high-level interference waves are present. Moreover, in an inter-base-station asynchronous system, an inter-base-station interference can be reduced.

(Eighth Embodiment)

According to the radio communication apparatus according to the seventh embodiment, the transmission beam pattern for setting the null in the interference wave arrival direction can be formed. However, the transmission beam cannot be directed to the desired wave arrival direction.

In a radio communication apparatus according to the eighth embodiment, the function of the radio communication apparatus of the sixth embodiment is combined with the function of the radio communication apparatus of the seventh embodiment. Thereby, the transmission beam can be directed to the desired wave and the null can be directed to the interference wave.

Figure 10:
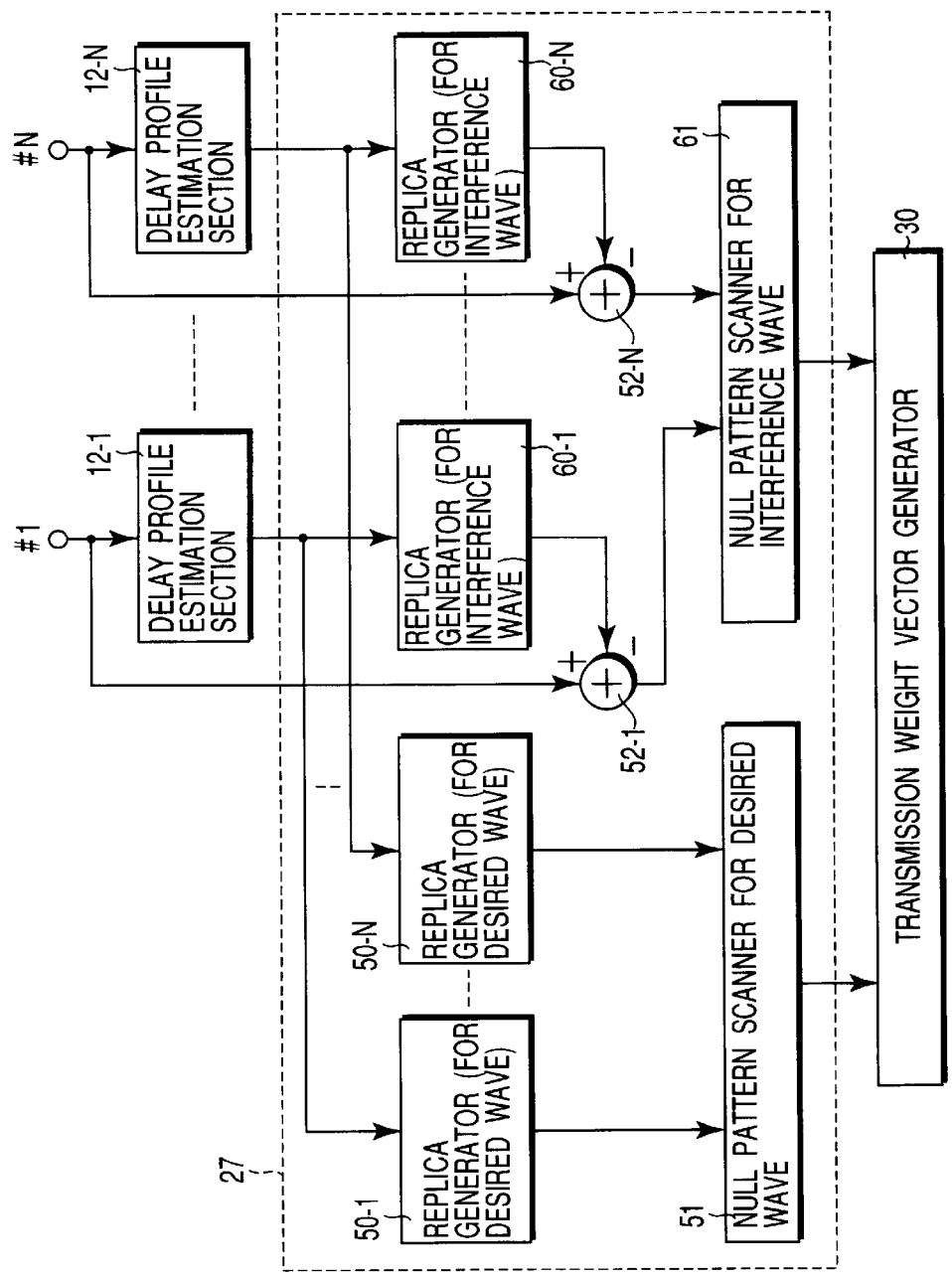
FIG. 10 is a block diagram showing the structure of a DOA estimation section according to an eighth embodiment of the invention.

FIG. 10 shows the structure of a DOA estimation section of the radio communication apparatus according to the eighth embodiment of the invention. The structural elements common to those in FIGS. 8 and 9 are denoted by like reference numerals.

In FIG. 10, the replica generators 50-1 to 50-N for a desired wave and the null pattern scanner 51 for a desired wave find the delay wave (desired wave) arrival direction, as described in connection with the sixth embodiment. The found delay wave (desired wave) arrival direction is input to the transmission weight vector generator 30.

On the other hand, the replica generators 60-1 to 60-N, adders 52-1 to 52-N and null pattern scanner 61 for interference waves find the interference wave arrival direction, as described in connection with the seventh embodiment. The found interference wave arrival direction is input to the transmission weight vector generator 30.

Based on the delay wave (desired wave) arrival direction output from the null pattern scanner 51 for desired wave and the interference wave arrival direction output from the null pattern scanner 61 for interference waves, the transmission weight vector generator 30 generates such transmission weight vectors as to direct the null to the interference wave arrival direction and to provide a maximum gain to the directivity in the delay wave (desired wave) arrival direction.

According to the radio communication apparatus of the eighth embodiment, the transmission beam having both the advantages of the radio communication apparatuses of the sixth and seventh embodiments can be obtained. That is, the null can be directed to the interference wave arrival direction, and the directivity for transmission has a maximum gain in the delay wave (desired wave) arrival direction.

The embodiments of the present invention have been described, but various modifications may be made as will be stated below.

(1) If the terminal station has means, such as a RAKE receiver or an adaptive equalizer, for separating a received signal of a desired wave and a received signal of delay waves of the desired wave and then synthesizing them through delaying operation, weighting, etc., the arrival angle range and arrival direction of not only the desired wave but also the delay wave may be estimated. Thus, a transmission beam having a gain in both the desired wave arrival direction and the delay wave arrival direction may be formed, or a multi-beam for the desired wave and delay wave may be formed. Thereby, a transmission diversity effect is obtained.

(2) In the preceding embodiments, the FDD system having different frequencies for transmission and reception is assumed. However, the present invention is applicable to the TDD system, as mentioned above. In this case, if the duplexer, 11-1 to 11-N, is replaced with a circulator having bi-directional isolation for three terminals, the same construction is realized and the same advantages are obtained.

(3) In the preceding embodiments, the system having no feedback signals from the terminal station to the base station is assumed as the system to which the present invention is applicable. However, if feedback signals from the terminal are available, a transmission beam control for maximizing the average reception SIR at each terminal station can be performed in the base station.

As has been described above, the present invention can provide a radio communication apparatus using an adaptive antenna, wherein the amount of arithmetic operations necessary for the arrival direction estimation and transmission weight vector determination, which in the prior art require a great deal of calculations and complex processes, can be remarkably reduced, and a transmission beam having a robustness to a variation in arrival direction can be formed. Thereby, the average reception SNR and average reception SIR at the opposing-side station can be improved. Accordingly, the repetition distance of the same frequency can be decreased, and as a result the frequency use efficiency of the system can be improved.

The present invention is applicable to a system using different frequencies for uplink and downlink. Thus, even in FDD-side system, the average reception SIR at the opposing station can be improved by the transmission beam control.

In the case that the radio communication apparatus of this invention is applied to currently employed cellular system base stations, the received signal strength at the terminal station is enhanced by the directivity gain of the transmission beam and consequently high-quality communication is ensured.

Furthermore, it is considered that with the directivity gain of the transmission beam, the coverage of cells increases equivalently. Thereby, non-sensitive zones can be eliminated, and the number of handover controls can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus comprising:
   a plurality of directional antennas;
   a delay profile estimation section configured to estimate a delay profile representing arrival times of a desired wave and delay waves and received powers for each of received signals from said antennas;
   an arrival angle range estimation section configured to estimate an arrival angle range of said desired wave from the delay profiles of the received signals estimated by said delay profile estimation section;
   a transmission antenna selection section configured to select at least one of the antennas which is to be used for transmission, on the basis of the arrival angle range estimated by said arrival angle range estimation section;
   a transmission section configured to transmit transmission signals using said at least one antenna selected by said transmission antenna selection section;
   a reception antenna selection section configured to select at least one of the antennas which is to be used for reception, on the basis of the arrival angle range estimated by said arrival angle range estimation section; and
   a section configured to obtain a reception output by subjecting to a predetermined signal processing a signal received from said at least one of the antennas selected by said reception antenna selection section.

2. A radio communication apparatus according to claim 1, further comprising:
   a transmission weight vector generating section configured to generate transmission weight vectors so as to set a maximum gain direction of directivity at a time of transmission in the arrival angle range estimated by the arrival angle range estimation section,
   wherein said transmission antenna selection section selects a plurality of antennas included in the arrival angle range estimated by the arrival angle range estimation section, and
   said transmission section feeds to the antennas selected by the transmission antenna selection section transmission signals multiplied by the transmission weight vectors generated by the transmission weight vector generating section, thereby transmitting the transmission signals.

3. A radio communication apparatus according to claim 2, further comprising:
   an arrival direction estimation section configured to estimate a direction of arrival of the desired wave from the arrival angle range estimated by said arrival angle range estimation section,
   wherein the transmission weight vector generating section generates the transmission weight vectors so as to set the maximum gain direction of the directivity at the time transmission in the arrival direction estimated by the arrival direction estimation section.

4. A radio communication apparatus according to claim 3, wherein said arrival direction estimation section comprises a section configured to detect the arrival direction by performing a scan using a predetermined scanning beam pattern within the arrival angle range estimated by said arrival angle range estimation section, and finding a maximum value of a reception output level obtained by said scan.

5. A radio communication apparatus according to claim 3, wherein said arrival direction estimation section detects the arrival direction by performing a scan using a predetermined scanning null pattern within the arrival angle range estimated by said arrival angle range estimation section, and finding a minimum value of a reception output level obtained by said scan.

6. A radio communication apparatus according to claim 3, wherein said arrival direction estimation section comprises a section configured to detect the arrival direction by performing a scan using a predetermined scanning beam pattern and a scan using a predetermined scanning null pattern within the arrival angle range estimated by said arrival angle range estimation section, and finding a maximum value in difference between reception output levels obtained by said both scans.

7. A radio communication apparatus according to claim 3, wherein said arrival direction estimation section comprises:
   a reception replica signal generating section configured to generate a replica of received signal on the basis of the delay profile estimated by the delay profile estimation section; and
   a section configured to perform a scan using at least one of a predetermined scanning beam pattern and a predetermined scanning null pattern within the arrival angle range estimated by the arrival angle range estimation section for the replica of received signal generated by said replica of received signal generating section, and detect arrival directions of the desired wave and the delay wave thereof on the basis of a reception output level obtained by said scan.

8. A radio communication apparatus according to claim 3, wherein said arrival direction estimation section comprises:
   a reception replica signal generating section configured to generate a replica of received signal on the basis of the delay profile estimated by the delay profile estimation section; and
   a section configured to perform a scan using at least one of a predetermined scanning beam pattern and a predetermined scanning null pattern within the arrival angle range estimated by the arrival angle range estimation section for the replica of received signal generated by said replica of received signal generating section, and detect arrival directions of the desired wave and the delay wave thereof on the basis of a reception output level obtained by said scan, and
   said apparatus further comprises:
   a synthesis section configured to synthesize the replica of received signal of each of delay waves generated by said replica of received signal generating section;
   a subtracter subtracting a synthesized replica signal synthesized by the synthesis section from the received signal from each of the antennas;
   an interference wave arrival direction estimation section configured to perform a scan using at least one of a predetermined scanning beam pattern and a predetermined scanning null pattern for an output from said subtracter, and to detect an arrival direction of an interference wave on the basis of a reception output level obtained by said scan; and
   a transmission weight vector generating section for interference waves, configured to generate transmission weight vectors so as to direct a null of directivity for transmission to the arrival direction of the interference wave estimated by the interference wave arrival direction estimating section, wherein said transmission section feeds to the antennas selected by the transmission antenna selection section transmission signals multiplied by the transmission weight vectors generated by the transmission weight vector generating section for interference waves, thereby transmitting the transmission signals.

9. A radio communication apparatus according to claim 3, further comprising:

a reception replica signal generating section configured to generate a replica of received signal on the basis of the delay profile estimated by the delay profile estimation section;

a synthesis section configured to synthesize the replica of received signal of each of delay waves generated by said replica of received signal generating section;

a subtracter subtracting a synthesized replica signal synthesized by the synthesis section from the received signal from each of the antennas;

an interference wave arrival direction estimation section configured to perform a scan using at least one of a predetermined scanning beam pattern and a predetermined scanning null pattern for an output from said subtracter, and to detect an arrival direction of an interference wave on the basis of a reception output level obtained by said scan; and a transmission weight vector generating section for interference waves, configured to generate transmission weight vectors so as to direct a null of directivity for transmission to the arrival direction of the interference wave estimated by the interference wave arrival direction estimating section, wherein said transmission section feeds to the antennas selected by the transmission antenna selection section transmission signals multiplied by the transmission weight vectors generated by the transmission weight vector generating section for interference waves, and transmits the transmission signals.

10. A radio communication apparatus comprising:

a plurality of omni-directional antennas;

a beam forming section configured to be connected to each of said antennas and to form a plurality of beams having different directions of radiation;

a plurality of delay profile estimation sections each configured to estimate a delay profile representing arrival times of a desired wave and delay waves and received powers for each of received signals by the beams formed by said beam forming section;

an arrival angle range estimation section configured to estimate an arrival angle range of said desired wave from the delay profile estimated by each of said delay profile estimation sections;

a transmission beam selection section configured to select at least one of the beams which is to be used for transmission, on the basis of the arrival angle range estimated by said arrival angle range estimation section;

a transmission section configured to transmit transmission signals using said at least one beam selected by said transmission beam selection section;

a reception beam selection section configured to select at least one of the beams which is to be used for reception, on the basis of the arrival angle range estimated by said arrival angle range estimation section; and a section configured to obtain a reception output by subjecting to a predetermined signal processing a received signal by said at least one of the beams selected by said reception beam selection section.

11. A radio communication apparatus according to claim 10, further comprising:

a transmission weight vector generating section configured to generate transmission weight vectors so as to set a maximum gain direction of directivity in the arrival angle range estimated by the arrival angle range estimation section, wherein said transmission beam selection section selects a plurality of beams included in the arrival angle range estimated by the arrival angle range estimation section, and said transmission section transmits transmission signals by using the beams selected by the transmission beam selection section transmission signals multiplied by the transmission weight vectors generated by the transmission weight vector generating section.

12. A radio communication apparatus according to claim 11, further comprising:

an arrival direction estimation section configured to estimate a direction of arrival of the desired wave from the arrival angle range estimated by said arrival angle range estimation section, wherein the transmission weight vector generating section generates the transmission weight vectors so as to set the maximum gain direction of directivity in the arrival direction estimated by the arrival direction estimation section.

13. A radio communication apparatus according to claim 12, wherein said arrival direction estimation section comprises a section configured to detect the arrival direction by performing a scan using a predetermined scanning beam pattern within the arrival angle range estimated by said arrival angle range estimation section, and finding a maximum value of a reception output level obtained by said scan.

14. A radio communication apparatus according to claim 12, wherein said arrival direction estimation section detects the arrival direction by performing a scan using a predetermined scanning null pattern within the arrival angle range estimated by said arrival angle range estimation section, and finding a minimum value of a reception output level obtained by said scan.

15. A radio communication apparatus according to claim 12, wherein said arrival direction estimation section comprises a section configured to detect the arrival direction by performing a scan using a predetermined scanning beam pattern and a scan using a predetermined scanning null pattern within the arrival angle range estimated by said arrival angle range estimation section, and finding a maximum value in difference between reception output levels obtained by said both scans.

16. A radio communication apparatus according to claim 12, wherein said arrival direction estimation section comprises:

a reception replica signal generating section configured to generate a replica of received signal on the basis of the delay profile estimated by the delay profile estimation section; and a section configured to perform a scan using at least one of a predetermined scanning beam pattern and a predetermined scanning null pattern within the arrival angle range estimated by the arrival angle range estimation section for the replica of received signal generated by said replica of received signal generating section, and detecting arrival directions of the desired wave and the delay wave thereof on the basis of a reception output level obtained by said scan.

17. A radio communication apparatus according to claim 12, wherein said arrival direction estimation section comprises:

a reception replica signal generating section configured to generate a replica of received signal on the basis of the delay profile estimated by the delay profile estimation section; and a section configured to perform a scan using at least one of a predetermined scanning beam pattern and a predetermined scanning null pattern within the arrival angle range estimated by the arrival angle range estimation section for the replica of received signal generated by said replica of received signal generating section, and detecting arrival directions of the desired wave and the delay wave thereof on the basis of a reception output level obtained by said scan, and said apparatus further comprises:

a synthesis section configured to synthesize the replica of received signal of each of delay waves generated by said replica of received signal generating section;

a subtracter subtracting a synthesized replica signal synthesized by the synthesis section from the received signal for each of the beams;

an interference wave arrival direction estimation section configured to perform a scan using at least one of a predetermined scanning beam pattern and a predetermined scanning null pattern for an output from said subtracter, and to detect an arrival direction of an interference wave on the basis of a reception output level obtained by said scan; and a transmission weight vector generating section for interference waves, configured to generate transmission weight vectors so as to direct a null of directivity for transmission to the arrival direction of the interference wave estimated by the interference wave arrival direction estimating section, wherein said transmission section transmits transmission signals by using the beams selected by the transmission beam selection section transmission signals multiplied by the transmission weight vectors generated by the transmission weight vector generating section for interference waves.

18. A radio communication apparatus according to claim 12, further comprising:

a reception replica signal generating section configured to generate a replica of received signal on the basis of the delay profile estimated by the delay profile estimation section;

a synthesis section configured to synthesize the replica of received signal of each of delay waves generated by said replica of received signal generating section;

a subtracter subtracting a synthesized replica signal synthesized by the synthesis section from the received signal for each of the beams;

an interference wave arrival direction estimation section configured to perform a scan using at least one of a predetermined scanning beam pattern and a predetermined scanning null pattern for an output from said subtracter, and to detect an arrival direction of an interference wave on the basis of a reception output level obtained by said scan; and a transmission weight vector generating section for interference waves, configured to generate transmission weight vectors so as to direct a null of directivity for transmission to the arrival direction of the interference wave estimated by the interference wave arrival direction estimating section, wherein said transmission section transmits transmissions signals by using the beams selected by the transmission beam selection section transmission signals multiplied by the transmission weight vectors generated by the transmission weight vector generating section for interference waves.

* * * * *